(12) United States Patent
Yamada et al.

(10) Patent No.: US 11,534,843 B2
(45) Date of Patent: Dec. 27, 2022

(54) WIRE ELECTRIC DISCHARGE MACHINING METHOD AND WIRE ELECTRIC DISCHARGE MACHINING APPARATUS

(71) Applicant: Sodick Co., Ltd., Kanagawa (JP)

(72) Inventors: Kuniharu Yamada, Kanagawa (JP); Kohei Matsuura, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 149 days.

(21) Appl. No.: 17/203,702

(22) Filed: Mar. 16, 2021

(65) Prior Publication Data
US 2021/0299771 A1  Sep. 30, 2021

(30) Foreign Application Priority Data

Mar. 31, 2020 (JP) ............................ JP2020-061990

(51) Int. Cl.
*G05B 19/41* (2006.01)
*B23H 1/02* (2006.01)

(52) U.S. Cl.
CPC ............. *B23H 1/02* (2013.01); *G05B 19/41* (2013.01); *B23H 2600/12* (2013.01); *G05B 2219/45221* (2013.01)

(58) Field of Classification Search
None
See application file for complete search history.

(56) References Cited

U.S. PATENT DOCUMENTS

| | | | |
|---|---|---|---|
| 4,559,434 A | 12/1985 | Kinoshita | |
| 5,041,984 A | 8/1991 | Watanabe | |
| 5,243,166 A | 9/1993 | Nakayama | |
| 7,465,898 B2 | 12/2008 | Kaneko | |

FOREIGN PATENT DOCUMENTS

| | | |
|---|---|---|
| JP | H01216725 | 8/1989 |
| JP | H0253526 | 2/1990 |
| JP | H0732217 | 2/1995 |
| JP | 2885228 | 4/1999 |
| JP | 3719305 | 11/2005 |
| JP | 4294638 | 7/2009 |
| JP | 5037895 B2 * | 10/2012 |
| JP | 5913751 | 4/2016 |

OTHER PUBLICATIONS

"Office Action of India Counterpart Application", dated Feb. 3, 2022, with English translation thereof, pp. 1-4.

* cited by examiner

*Primary Examiner* — Ryan A Jarrett
(74) *Attorney, Agent, or Firm* — JCIPRNET

(57) ABSTRACT

To automatically change and set machining conditions suitable for a plate thickness even when machining paths of a rough machining step and an end surface finishing step are different in level difference machining in which the plate thickness changes during machining. In a wire electric discharge machining method and a wire electric discharge machining apparatus of the disclosure, an XY-plane of a workpiece stand is divided into small regions to form a plurality of divided regions, and a plate thickness of the workpiece is detected and stored in association with the divided regions. Thereafter, whether there is a level difference ahead of a traveling direction of a machining path is estimated according to plate thickness information associated with the divided regions and a plate thickness of the workpiece at a current machining position, and machining conditions are changed.

6 Claims, 16 Drawing Sheets

WIRE ELECTRIC DISCHARGE MACHINING METHOD AND WIRE ELECTRIC DISCHARGE MACHINING APPARATUS

CROSS-REFERENCE TO RELATED APPLICATION

This application claims the priority benefit of Japan application serial no. 2020-061990, filed on Mar. 31, 2020. The entirety of the above-mentioned patent application is hereby incorporated by reference herein and made a part of this specification.

BACKGROUND

Technical Field

The disclosure relates to a wire electric discharge machining method in which electric discharge machining is performed under machining conditions suitable for a plate thickness of a workpiece, and a wire electric discharge machining apparatus which automatically sets machining conditions suitable for a plate thickness of a workpiece.

Related Art

The wire electric discharge machining is an electric discharge machining method in which a predetermined machining voltage pulse is repeatedly applied to a machining gap formed between a workpiece and a wire electrode that is stretched between a pair of wire guides to intermittently generate an electric discharge, a material is removed from the workpiece by an electric discharge energy, and the workpiece is cut into a desired machining shape.

In this wire electric discharge machining method, there is a case where the plate thickness changes during machining of one machining shape (hereinafter referred to as level difference machining). If the plate thickness changes during the machining, an amount of material removal increases and decreases and a material removal rate changes, which causes a problem that a difference is generated in a machining groove width at sites having different plate thicknesses and necessary machining shape precision cannot be obtained, or a problem that the wire electrode is easy to break. Therefore, conventionally, the level difference machining is adopted in which the level difference position of the workpiece is automatically detected and the electrical machining conditions and the like are appropriately switched to perform the electric discharge machining.

Patent literature 1 (Japanese Patent No. 4294638) discloses an invention relating to a wire-cut electric discharge machining method and a numerically controlled wire-cut electric discharge machining apparatus. In a rough machining step, a change in a plate thickness is detected, and the plate thickness is stored in association with a level difference position at that time. Next, an invention is described in which in an end surface finishing step, desired machining conditions are changed and set to machining conditions suitable for the plate thickness when the machining portion reaches a peripheral region of the level difference position (claim 1).

Patent literature 2 (Japanese Patent No. 2885228) discloses an invention relating to a wire electric discharge machining method and a wire electric discharge machining apparatus. Patent literature 2 discloses that level difference position information is acquired from a level difference position detection part during execution of a rough machining which is the first machining, and a correction section in the second and subsequent machining is set, and discloses that when the wire electrode enters the correction section, a correction step is performed to gradually tilt a posture of the wire electrode (paragraphs 0038 and 0047 in Patent literature 2).

When electric discharge machining is performed, first, rough machining (first cut) is performed in which emphasis is given to the material removal rate rather than the shape error and the surface roughness, and a finishing allowance is left. Thereafter, it becomes a mainstream to change an offset amount and machine a machining program of the same machining path for a plurality of times in order to finish the surface roughness to adjust the shape precision in end surface finishing machining (second cut or later). However, in recent years, due to an influence of diversification of products formed by the electric discharge machining, the number of machining times is increased only in a range of a part of the workpiece to perform the machining in the end surface finishing machining, or the electric discharge machining is also performed in which when a plurality of products are taken out from one workpiece, first, rough machining is performed at once on all of the plurality of products, and thereafter, a second cut, a third cut, and a fourth cut are performed on one of the roughly machined products.

However, in the method of Patent literature 1, it is necessary that the position of a level difference detected in the rough machining step and the order in which the level difference is detected are also stored, and the level difference position is specified in the stored order or the stored reverse order to change the machining conditions in the subsequent end surface finishing step. Therefore, when the machining path in the rough machining step and the machining path in the subsequent end surface finishing step are different, the change in the machining conditions cannot be applied. Thus, when the machining paths of the rough machining step and the end surface finishing step are different, a change of arranging an auxiliary path to match the machining paths is necessary.

Thus, the disclosure provides a wire electric discharge machining method and a wire electric discharge machining apparatus which can automatically change and set machining conditions suitable for a plate thickness even when machining paths of a rough machining step and an end surface finishing step are different in level difference machining in which the plate thickness changes during machining, and can more easily obtain an excellent machining result. Several specific advantages that can be obtained in the disclosure are described later in detail.

SUMMARY

The wire electric discharge machining method of the disclosure includes: a division step in which an XY-plane of a workpiece stand of a wire electric discharge machining apparatus is divided into small regions to form a plurality of divided regions; a storage step in which a plate thickness of the workpiece is detected and stored in association with the divided regions as plate thickness information; an estimation step in which a peripheral region including a current machining position of the workpiece is set as a search range, and with reference to the plate thickness information associated with the divided regions within the search range, whether there is a level difference ahead of a traveling direction of a machining path is estimated according to the plate thickness information associated with the divided regions and a plate thickness of the workpiece at the current machining position; and a machining condition change step in which a peripheral region including a position of the level difference is set as a machining condition change range, and machining conditions are changed when the current machining position of the workpiece enters the machining condition change range.

In addition, the disclosure is a wire electric discharge machining apparatus including a NC controller. The NC controller includes: a detection unit which detects a plate thickness of a workpiece in a rough machining step; a storage unit which stores the plate thickness in association with divided regions obtained by dividing an XY-plane of a workpiece stand of the wire electric discharge machining apparatus into small regions; and a processing unit. In an end surface finishing step, the processing unit sets a peripheral region including a current machining position of the workpiece as a search range, and with reference to the plate thickness information associated with the divided regions within the search range, estimates whether there is a level difference ahead of a traveling direction of a machining path according to the plate thickness information associated with the divided regions and a plate thickness of the workpiece at the current machining position. Besides, the processing unit sets a peripheral region including a position of the level difference as a machining condition change range, and performs a control of changing the machining conditions when the current machining position of the workpiece enters the machining condition change range.

DESCRIPTION OF THE EMBODIMENTS

Figure 1:
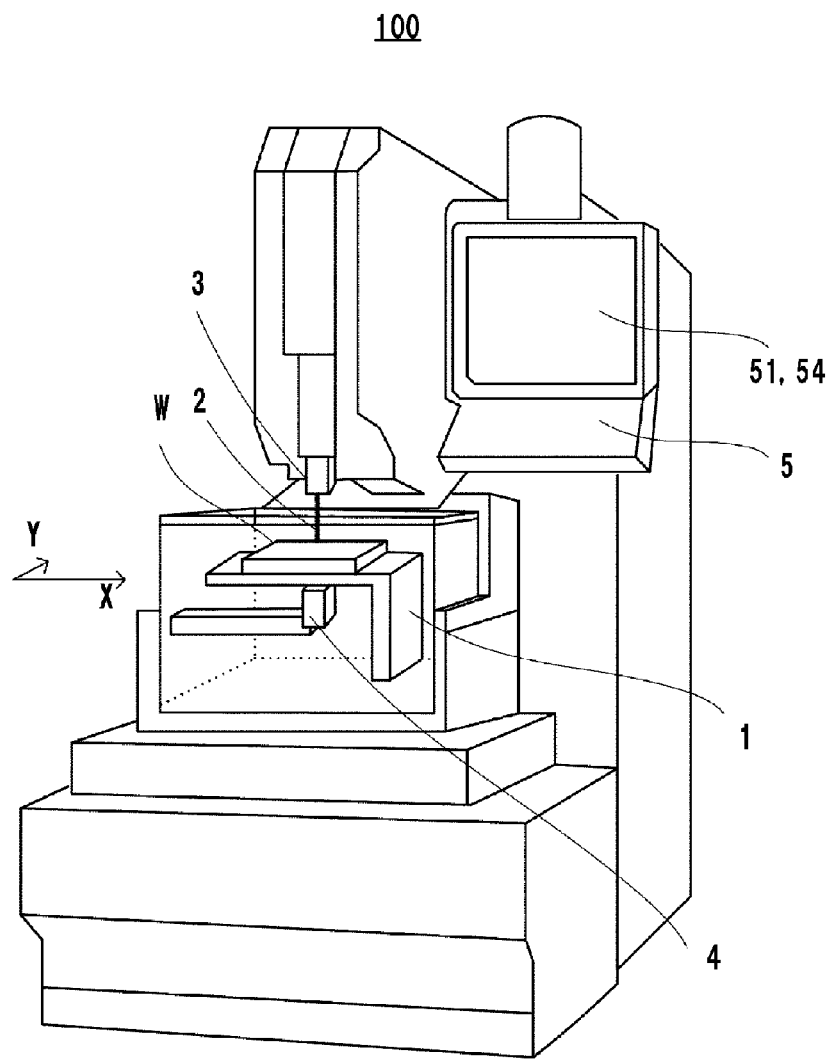
FIG. 1 is a schematic diagram showing a wire electric discharge machining apparatus 100 according to an embodiment of the disclosure.

The wire electric discharge machining method of the disclosure includes: a division step in which an XY-plane of a workpiece stand of a wire electric discharge machining apparatus is divided into small regions to form a plurality of divided regions; a storage step in which a plate thickness of the workpiece is detected and stored in association with the divided regions as plate thickness information; an estimation step in which a peripheral region including a current machining position of the workpiece is set as a search range, and with reference to the plate thickness information associated with the divided regions within the search range, whether there is a level difference ahead of a traveling direction of a machining path is estimated according to the plate thickness information associated with the divided regions and a plate thickness of the workpiece at the current machining position; and a machining condition change step in which a peripheral region including a position of the level difference is set as a machining condition change range, and machining conditions are changed when the current machining position of the workpiece enters the machining condition change range.

In addition, in the wire electric discharge machining method of the disclosure, the storage step is executed in a rough machining step, and the estimation step and the machining condition change step are executed in an end surface finishing step.

In addition, the disclosure is a wire electric discharge machining apparatus including a NC controller. The NC controller includes: a detection unit which detects a plate thickness of a workpiece in a rough machining step; a storage unit which stores the plate thickness in association with divided regions obtained by dividing an XY-plane of a workpiece stand of the wire electric discharge machining apparatus into small regions; and a processing unit. In an end surface finishing step, the processing unit sets a peripheral region including a current machining position of the workpiece as a search range, and with reference to the plate thickness information associated with the divided regions within the search range, estimates whether there is a level difference ahead of a traveling direction of a machining path according to the plate thickness information associated with the divided regions and a plate thickness of the workpiece at the current machining position. Besides, the processing unit sets a peripheral region including a position of the level difference as a machining condition change range, and performs a control of changing the machining conditions when the current machining position of the workpiece enters the machining condition change range.

According to the disclosure, the XY-plane of the workpiece stand of the wire electric discharge machining apparatus is divided into the plurality of small regions during the rough machining, and the plate thickness is stored in association with the divided regions. During the end surface finishing machining, the divided regions around the machining position are searched, and whether there is a level difference in the periphery is estimated with reference to the plate thickness information associated with the divided regions. Thus, even when the machining paths of the rough machining step and the end surface finishing step are different, the level difference position can be appropriately determined.

In the wire electric discharge machining method of the disclosure, in the storage step, first plate thickness information which is a plate thickness at the time of the detection and second plate thickness information which is a previous plate thickness are stored in association with the divided regions. In the estimation step, when a machining path of the end surface finishing step is in the same direction as a machining path of the rough machining step, whether there is a level difference ahead of the traveling direction of the machining path is estimated according to the first plate thickness information and the plate thickness of the workpiece at the current machining position. When the machining path of the end surface finishing step is in the opposite direction to the machining path of the rough machining step, whether there is a level difference ahead of the traveling direction of the machining path is estimated according to the second plate thickness information and the plate thickness of the workpiece at the current machining position.

According to the disclosure, the plate thickness at the time of the detection and the plate thickness previously detected are stored in association with the divided regions, and the plate thickness to be referred to is switched and changed according to whether the machining paths of the end surface finishing step and the rough machining step are in the same direction or opposite directions. Accordingly, the plate thickness in the traveling direction of the machining can be accurately estimated in the end surface finishing step, and accuracy of estimating the level difference position can be improved.

In the wire electric discharge machining method of the disclosure, in the storage step, a position in which the plate thickness of the workpiece is detected is stored in association with the divided regions; and in the machining condition change step, a range centered on the position in which the plate thickness of the workpiece is detected is set as the machining condition change range.

In addition, in the wire electric discharge machining method of the disclosure, in the machining condition change step, when the machining conditions are changed, the machining conditions are changed step by step with respect to a target value for changing the machining conditions.

According to the disclosure, because the range centered on the position where the plate thickness of the workpiece is detected is set as the machining condition change range, the level difference position can be reliably specified even if the machining path is deviated in each machining step and the machining conditions can be changed.

In addition, according to the disclosure, when the machining conditions are changed and set, the machining conditions are changed step by step with respect to the target value for changing the machining conditions, and thereby the machining conditions are not suddenly changed at the level difference position. Therefore, an influence of an unavoidable and slight error on the machining result can be reduced, the error being caused by determination of the level difference position in the regions.

The wire electric discharge machining method and the wire electric discharge machining apparatus of the disclosure can automatically change and set the machining conditions at the level difference position even when the machining paths of the rough machining step and the end surface finishing step are different. Therefore, the wire electric discharge machining method and the wire electric discharge machining apparatus which can more easily obtain an excellent machining result can be provided.

Figure 2:
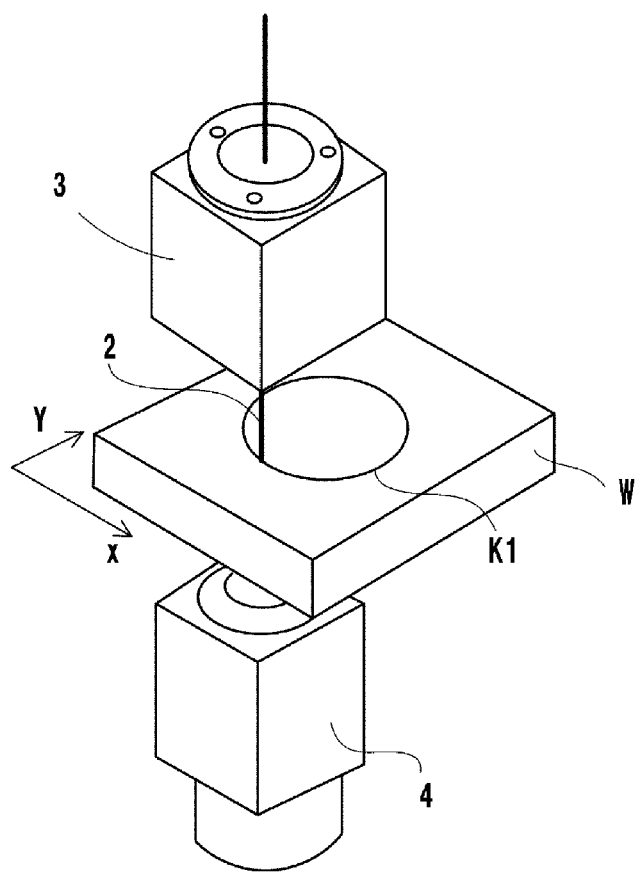
FIG. 2 is an enlarged schematic diagram of the periphery of a machining region of the wire electric discharge machining apparatus 100 according to the embodiment.
Figure 5:
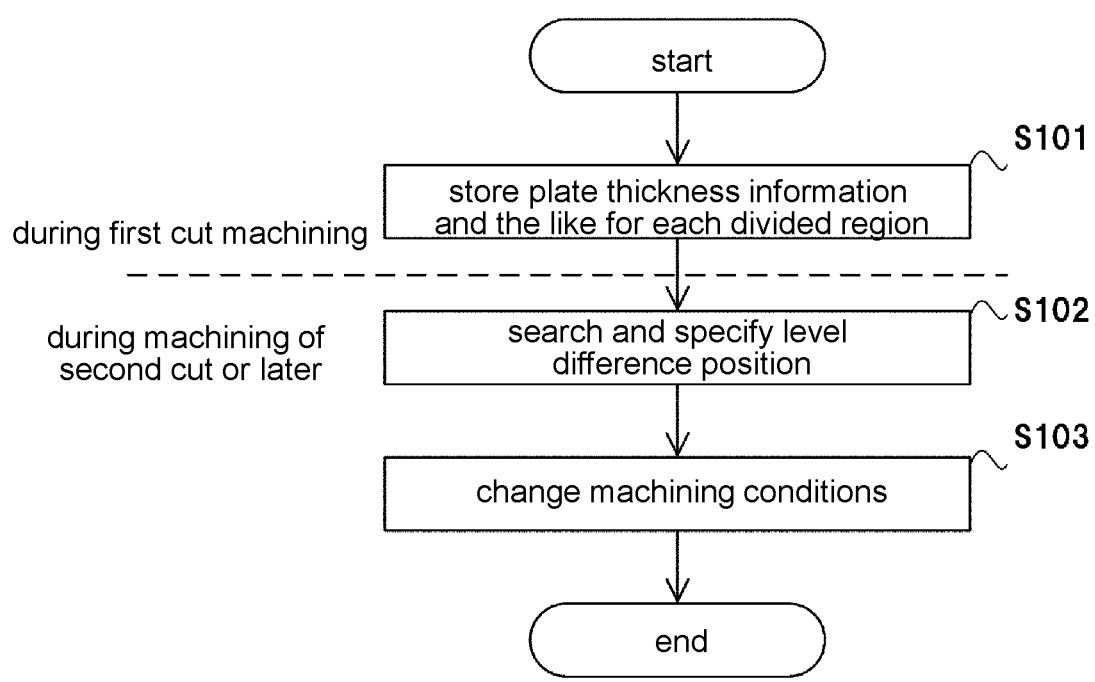
FIG. 5 is a flowchart showing a process from storing plate thickness information and the like to changing machining conditions in a wire electric discharge machining method of the disclosure.

FIG. 1 is a schematic diagram showing a wire electric discharge machining apparatus 100 according to an embodiment of the disclosure. FIG. 2 is an enlarged schematic diagram of the periphery of a machining region of the wire electric discharge machining apparatus 100 according to the embodiment. FIG. 5 is a flowchart showing a process from storing plate thickness information and the like to changing machining conditions in a wire electric discharge machining method of the disclosure.

The wire electric discharge machining apparatus 100 according to the embodiment of the disclosure includes a pair of wire guides 3 and 4, a wire electrode 2 stretched between the wire guides 3 and 4, a workpiece stand 1 mounted parallel to an XY-plane which is a reference surface when a surface of a workpiece W is machined, and a NC controller 5. The wire electric discharge machining apparatus 100 moves the wire guides 3 and 4 on the XY-plane with respect to the workpiece W, repeatedly applies a predetermined machining voltage pulse to a machining gap formed between the wire electrode 2 and the workpiece W to intermittently generate an electric discharge, removes a material from the workpiece W by an electric discharge energy, and cuts the workpiece W into a desired machining shape.

The wire electric discharge machining apparatus 100 cuts the workpiece W by dividing the cutting into a plurality of machining steps such as a rough machining step, a finishing step, and the like. A rough machining step in which the workpiece W is first roughly machined into a desired machining shape is referred to as a first cut, and an end surface finishing step in which a machined surface of a roughly formed hole is machined is referred to as a second cut, a third cut, and a fourth cut in the order of machining steps.

The wire electric discharge machining apparatus 100 of the disclosure divides the XY-plane of the workpiece stand 1 into small regions during the first cut machining, and stores plate thickness information and the like for each divided region (S101: division step and storage step). Then, in machining steps of the second cut machining or later, the wire electric discharge machining apparatus 100 uses the plate thickness information for each divided region stored during the first cut machining to search and estimate a level difference position of the workpiece W (S102: estimation step), and performs a control of changing the machining conditions (S103: machining condition change step).

Figure 15:
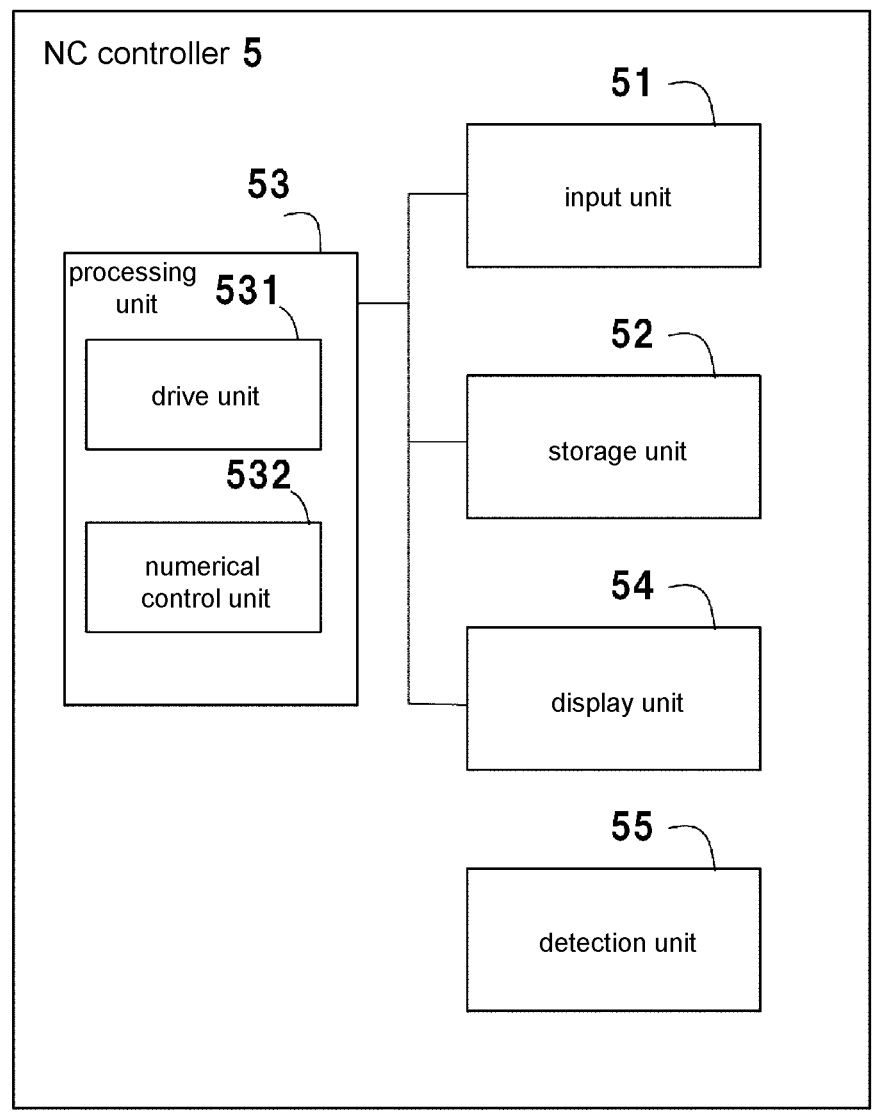
FIG. 15 is a block diagram showing a configuration of a NC controller 5 of the wire electric discharge machining apparatus 100 of the disclosure.

FIG. 15 is a block diagram showing a configuration of the NC controller 5 of the wire electric discharge machining apparatus 100 of the disclosure.

The NC controller 5 is an apparatus that numerically controls the entire operation of the wire electric discharge machining apparatus 100, and includes an input unit 51, a storage unit 52, a processing unit 53, a display unit 54, and a detection unit 55.

The input unit 51 is, for example, an input apparatus such as a keyboard, a touch panel superposed on a display surface of the display unit. The display unit 54 is configured by, for example, a display device such as a liquid crystal display or the like, and displays a setting screen or the like.

The storage unit 52 stores programs for performing various processing and various setting values.

The detection unit 55 detects a machining feed rate (F value), the number of discharge times, a machining voltage, and the like in real time when the wire electric discharge machining apparatus 100 is being driven.

The processing unit 53 is configured by a drive unit 531 and a numerical control unit 532.

The numerical control unit 532 converts a machining program including a machining shape trajectory and machining conditions into a command signal for operating devices of the wire electric discharge machining apparatus 100 such as a machining power device, a motor control device, and a machining liquid supply device.

In addition, the numerical control unit 532 executes a division step, a plate thickness information calculation step, a storage step, an estimation step of the level difference position, and a machining condition change step, which are described later, and performs processing of automatically detecting the level difference position and changing the machining conditions.

The drive unit 531 actually drives each device in response to the command from the numerical control unit 532.

Next, the step (S101) of storing the plate thickness information and the like for each divided region during the first cut machining is described with reference to a flowchart of FIG. 6.

First, after the power is turned on, the NC controller 5 equally divides the XY-plane which is the reference surface when machining is performed before the first cut machining is started, and sets the divided regions M[i][j] (S201: division step).

When the first cut step is started (S202), the NC controller 5 acquires a position of the wire electrode 2 on a machining path K1 for each sampling time Δt (hereinafter, the position of the wire electrode 2 on the machining path is used as the machining position). In addition, the plate thickness information is calculated based on the machining feed rate (F value), the number of discharge times, the machining voltage, and the like detected by the detection unit 55 (S203: plate thickness information calculation step).

The NC controller 5 searches which divided region M[i][j] the current machining position is positioned in, and judges whether divided region data D[i][j] described later is already stored in the searched divided region M[i][j]. When the divided region data D[i][j] is stored, only an x-coordinate and a y-coordinate of the current machining position are overwritten without overwriting the calculated plate thickness information. When the plate thickness information and the like are not stored in the divided region data D[i][j], first plate thickness information, second plate thickness information, the x-coordinate and the y-coordinate of the current machining position, an offset direction, and an index value are stored (S204: storage step).

S203 and S204 are continuously repeated for each sampling time Δt until the first cut step is completed.

Figure 3:
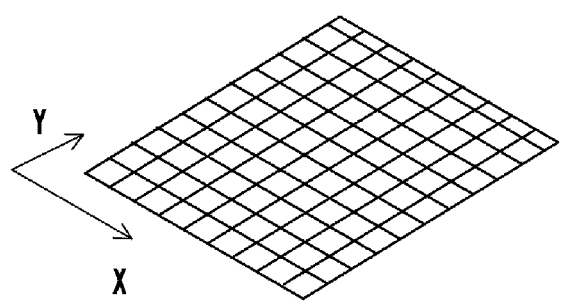
FIG. 3 is a schematic diagram 1 illustrating a division step according to the embodiment.
Figure 4:
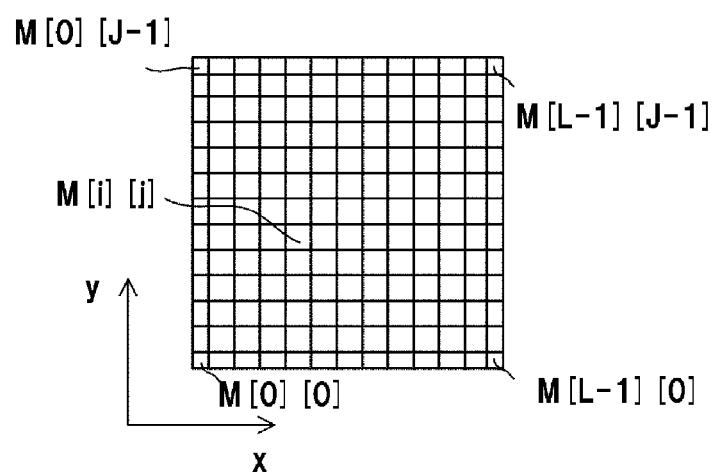
FIG. 4 is a schematic diagram 2 illustrating the division step according to the embodiment.

FIG. 3 and FIG. 4 are schematic diagrams illustrating the division step according to the embodiment.

Specifically, the division step S201 is a step of equally dividing the XY-plane with a preset division width and setting a large number of the divided regions M[i][j] as shown in FIGS. 3 and 4. For example, the XY-plane is equally divided with a division width of 0.5 mm into 2000×2000 small regions having 0.5 mm square. The divided regions M[i][j] are divided into L in the x-axis direction and are divided into J in the y-axis direction, and for convenience, in the specification, each divided region is referred to as M[i][j] (0≤i<L, 0≤j<J, where i and j are integers greater than or equal to 0).

Specifically, the plate thickness information calculation step S203 is a step of calculating the plate thickness of the workpiece W on the machining path K1 during the first cut machining. The plate thickness of the workpiece W can be obtained by substituting a correction coefficient determined for each of a wire diameter and a workpiece material which are used, and the machining feed rate (F value), the number of discharge times, and the machining voltage which are detected into a predetermined calculation formula.

The storage step S204 is a step of storing the data (the divided region data D[i][j]) for each divided region M[i][j] on the machining path K1 during the first cut machining. Specifically, the divided region data D[i][j] includes: first plate thickness information now_thick which is the current plate thickness information; second plate thickness information pre_thick which is the previous plate thickness information; an index value index which is a serial number of the data recording; an x-coordinate value x_pos of the position where the plate thickness is detected; a y-coordinate value y_pos of the position where the plate thickness is detected; and offset direction information offset indicating which side of the traveling direction the machining path K1 is positioned on with respect to the machining surface of the workpiece W. The divided region data D[i][j] is stored in association with the divided regions M[i][j]. Here, the second plate thickness information is obtained by storing the first plate thickness information now_thick whose index value is stored in the previous divided region data D[i][j].

For example, when the x-coordinate of the current machining position is 100.24 mm, the y-coordinate is 200.54 mm, the current plate thickness is 40 mm, the first plate thickness information whose index value is stored in the previous divided region data D[i][j] is 30 mm, and the offset direction is "right in the traveling direction", which are stored as the 10th divided region data D, a case is considered in which and the XY-plane is equally divided with a division width of 1.0 mm into 2000×2000 small regions having 1.0 mm square as the divided regions M[i][j]. In this case, the x-coordinate value x_pos=100.24 mm, the y-coordinate value y_pos=200.54 mm, the first plate thickness information now_thick=40 mm, the second plate thickness information pre_thick=30 mm, the offset direction information offset="right in the traveling direction", and the index value index=10 are stored as divided region data D[100][200] of a divided region M[100][200].

Here, because the plate thickness information cannot be detected in the divided regions M[i][j] that are not positioned on the machining path K1 during the first cut machining, data stored in the divided region data D[i][j] does not exist. In this case, the index value is 0 because the index value is not overwritten.

Figure 7:
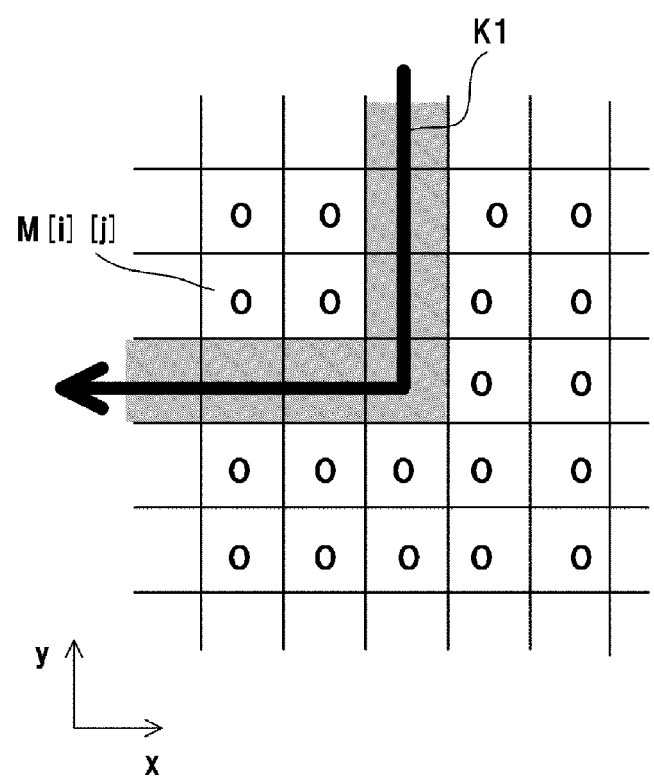
FIG. 7 is a schematic diagram showing a state of storing region division data during the first cut machining in the wire electric discharge machining method of the disclosure.

FIG. 7 is a schematic diagram showing a state of storing the region division data during the first cut machining in the wire electric discharge machining method of the disclosure.

Figure 6:
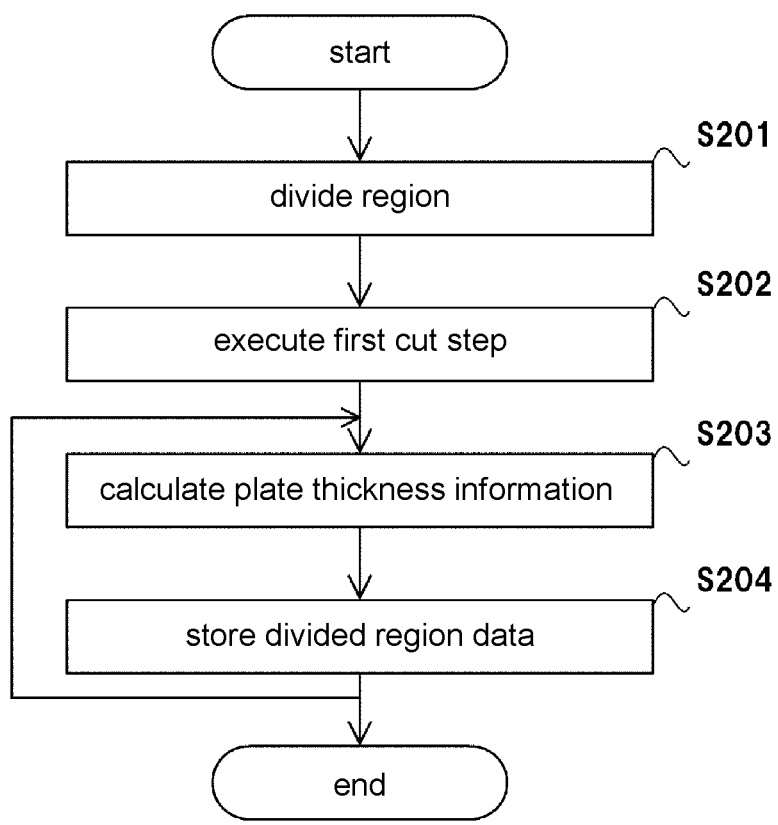
FIG. 6 is a flowchart showing steps of storing the plate thickness information and the like for each divided region during first cut machining in the wire electric discharge machining method of the disclosure.

According to the flowchart of FIG. 6, as shown in FIG. 7, there is a state that the divided region data D[i][j] is stored in the divided region M[i][j] existing on the machining path K1 for the first cut (in FIG. 7, a divided region M indicated by a diagonal line is a region where the divided region data D is stored), and the divided region data D[i][j] is not stored in the divided region M[i][j] that does not exist on the machining path K1 for the first cut (for example, the index value is 0).

Figure 8:
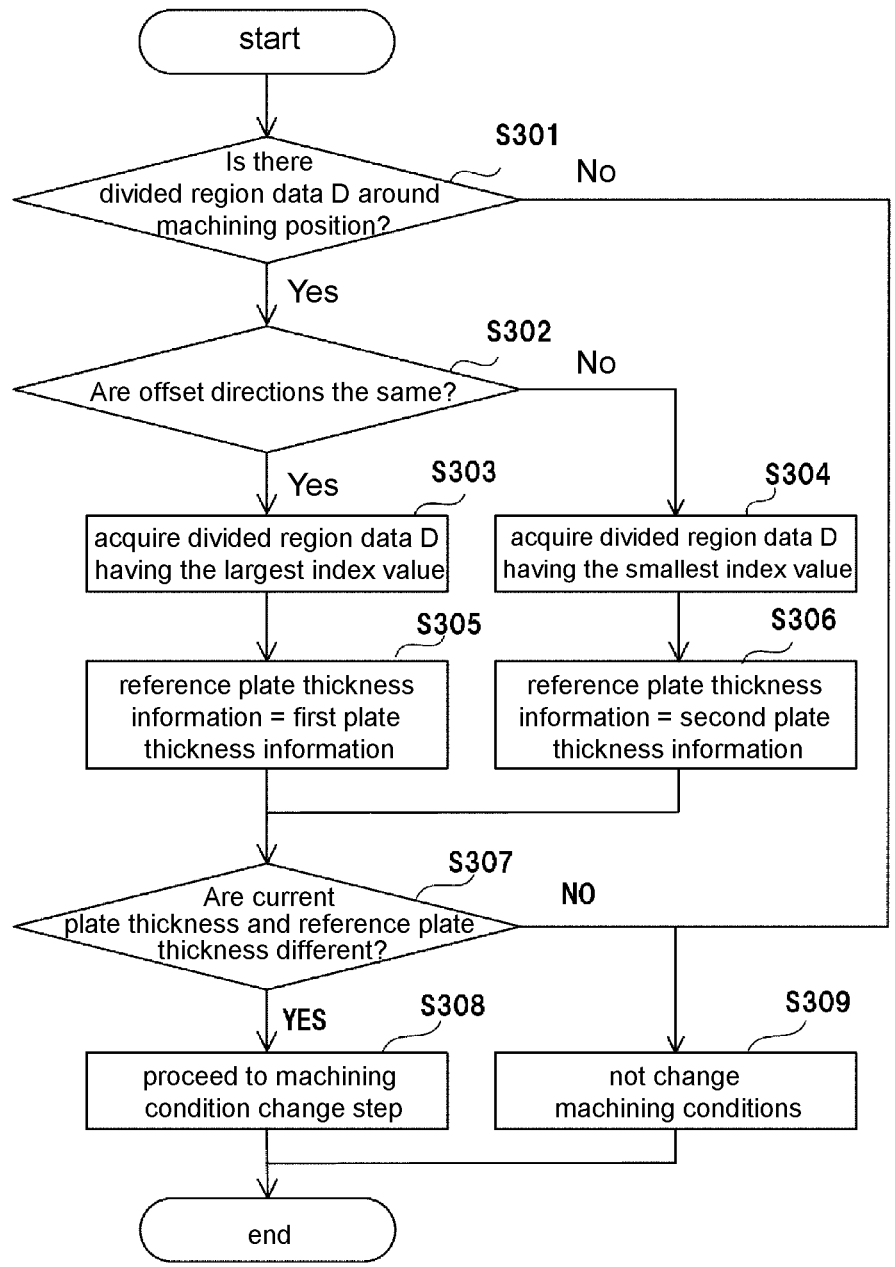
FIG. 8 is a flowchart showing an estimation step of a level difference position during machining of a second cut or later in the wire electric discharge machining method of the disclosure.
Figure 9:
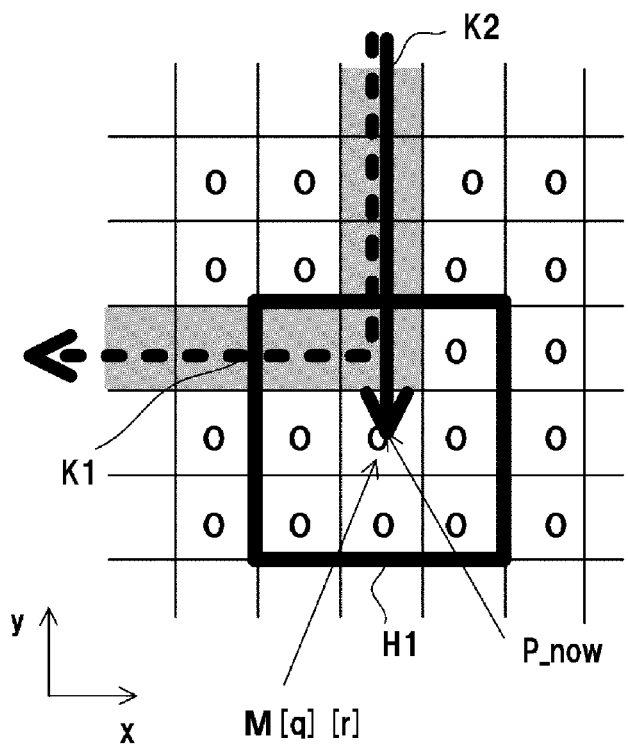
FIG. 9 is a schematic diagram showing a method of searching and specifying the level difference position during second cut machining of the disclosure.

FIG. 8 is a flowchart showing an estimation step of the level difference position during machining of the second cut or later in the wire electric discharge machining method of the disclosure. FIG. 9 is a schematic diagram showing a method of searching and specifying the level difference position during the second cut machining of the disclosure.

Here, the estimation step (S102) of the level difference position during the second cut machining is described. Because the third cut and the fourth cut after the second cut, and the subsequent machining steps have the same flow, the second cut machining step is described as an example in the following description.

When the second cut machining is started, the NC controller 5 acquires a current machining position P_now for each sampling time Δt and sets a search range H1 from the current machining position P_now. In the embodiment, as shown in FIG. 9, a divided region M[q][r] including the current machining position P_now and eight regions around the divided region M[q][r], which are M[q−1][j−1], M[q−1][r], M[q−1][r+1], M[q][r−1], M[q][r+1], M[q+1][r−1], M[q+1][r], M[q+1][r+1], are set as search targets (here q and r are integers greater than or equal to 1).

Next, search is made on whether the divided region M in which the divided region data D is stored exists in the search range H1 (S301). In the example shown in FIG. 9, it is shown that the divided region data D respectively exists in the divided region M[q−1][r+1] and the divided region M[q][r+1]. Here, in FIG. 9, the divided region M indicated by a diagonal line is a region in which the divided region data D is stored. If the divided region M in which the divided region data D is stored does not exist, the machining conditions are not changed (S311).

Then, determination is made on whether the offset direction in the current machining (second cut machining) and the offset direction in the first cut are the same (S302). When the offset direction in the current machining and the offset direction in the first cut are the same, a divided region M having the largest index value among the searched plurality of divided regions is selected (S303), and the selected divided region M is stored as a reference divided region MT. Then, first plate thickness information stored in the divided region data of the reference divided region MT is stored as reference plate thickness information change_thick (S305). On the other hand, when the offset direction in the current machining and the offset direction in the first cut are different, a divided region M having the smallest index value among the searched plurality of divided regions is selected (S304), and the selected divided region M is stored as the reference divided region MT. Then, second plate thickness information stored in the divided region data of the reference divided region MT is stored as the reference plate thickness information change_thick (S306).

Figure 10:
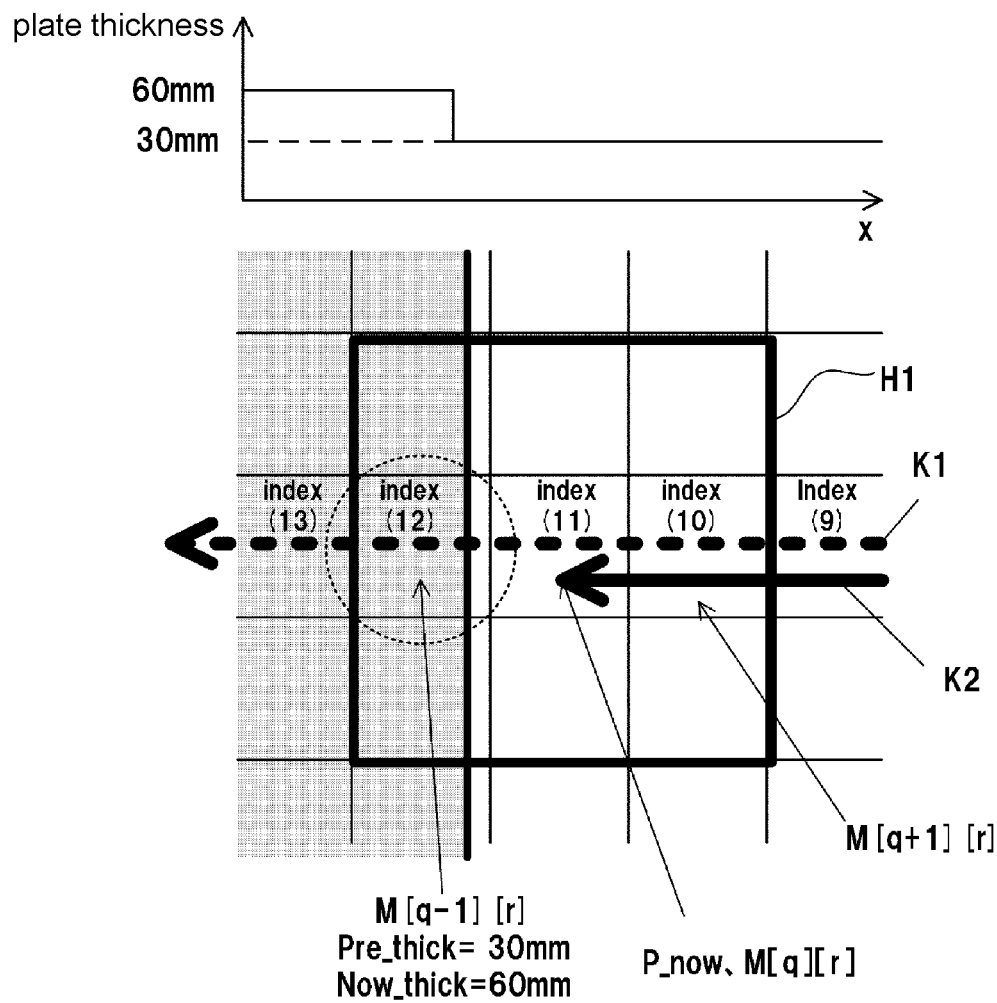
FIG. 10 is a schematic diagram showing the method of searching and specifying the level difference position during the second cut machining of the disclosure (when offset directions are the same).
Figure 11:
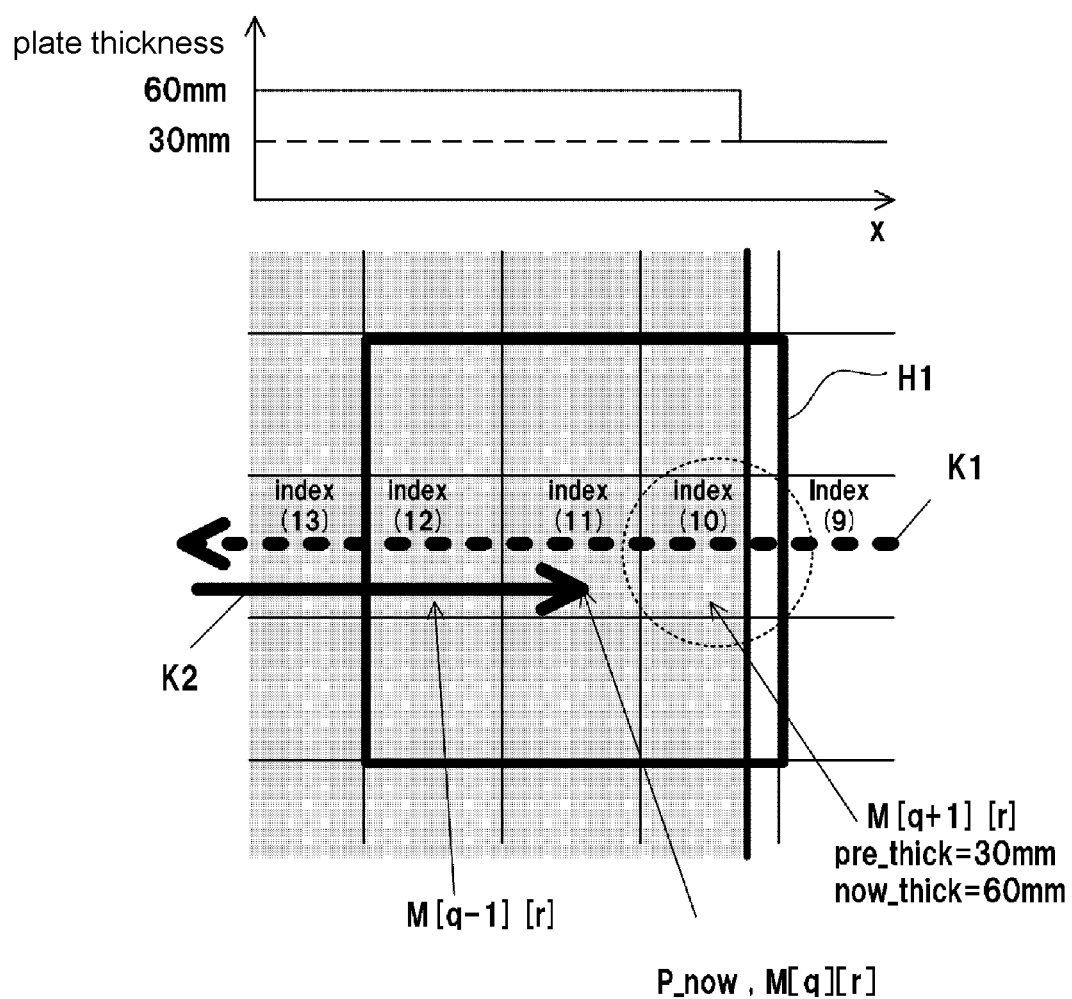
FIG. 11 is a schematic diagram showing the method of searching and specifying the level difference position during the second cut machining of the disclosure (when the offset directions are different).

FIGS. 10 and 11 are schematic diagrams showing a method of searching and specifying the level difference position during the second cut machining of the disclosure. In FIGS. 10 and 11, for simplicity of description, index values (9, 10, . . . ) of the divided region data D are described in the divided region M, and sites where the plate thickness is 60 mm are hatched with dots. Sites that are not hatched with dots are sites where the plate thickness is 30 mm. In addition, the plate thickness value is set to 60 mm and 30 mm for convenience, but the plate thickness value is not actually limited and may be any value.

The reason for changing the selection method of the divided region M depending on the difference in the offset direction is described below. The offset direction in the wire electric discharge machining apparatus is information indicating whether the machining path K1 is positioned on the right or on the left of the traveling direction with respect to the machining surface of the workpiece W, and the information regarding the offset direction can determine whether the traveling direction of the wire electric discharge machining apparatus is the same or opposite for the first cut and the second cut. If the offset directions are the same, the traveling direction is the same for the first cut and the second cut (FIG. 10), and if the offset directions are opposite, the traveling direction is opposite for the first cut and the second cut (FIG. 11).

When there are a plurality of divided regions M having the divided region data D in the search range H1, the divided region data D of which divided region M is referred to becomes a problem.

When the first cut and the second cut are in the same traveling direction (FIG. 10), whether there is a change in the plate thickness (level difference) ahead of the traveling direction of the second cut becomes a problem, and thus, the divided region M having the largest index value (index=12 in the case of FIG. 10) is set as the reference divided region MT (S303). Then, the first plate thickness information now_thick stored in the divided region data D of the reference divided region MT is used as the reference plate thickness information (S305). For example, in the case of FIG. 10, because the traveling direction is the same for the first cut and the second cut, the divided region M[q−1][r] having an index value of 12 is set as the reference divided region MT, and the first plate thickness information now_thick is used as the reference plate thickness information with reference to the divided region data D[q−1][r] (S305). This is because the plate thickness value that is expected to change ahead of the traveling direction of the second cut is considered to be a value of the first plate thickness information now_thick.

On the other hand, when the first cut and the second cut are in opposite directions (FIG. 11), the divided region M having the smallest index value (index=10 in the case of FIG. 11) is set as the reference divided region MT (S304). Then, the second plate thickness information pre_thick stored in the divided region data D of the reference divided region MT is used as the reference plate thickness information (S306). For example, in the case of FIG. 11, because the traveling direction is opposite for the first cut and the second cut, the divided region M[q+1][r] having an index value of 10 is used as the reference divided region MT, and the second plate thickness information pre_thick is used as the reference plate thickness information with reference to the divided region data D[q+1][r]. This is because the plate thickness value that is expected to change ahead of the traveling direction of the second cut is considered to be a value of the second plate thickness information pre_thick.

Next, the NC controller 5 determines whether the current plate thickness and the reference plate thickness information are different (S307). If the current plate thickness and the reference plate thickness information are different, it is judged that there is a level difference ahead of the traveling direction of the second cut, and the process proceeds to the machining condition change step (S308). If the current plate thickness and the reference plate thickness information are the same, it is judged that there is no level difference ahead of the travelling direction of the second cut, and without changing the machining conditions (S309), the process returns to the beginning and S301 to S309 are repeated for the next machining position P_now that has been moved for each sampling time Δt.

Figure 12:
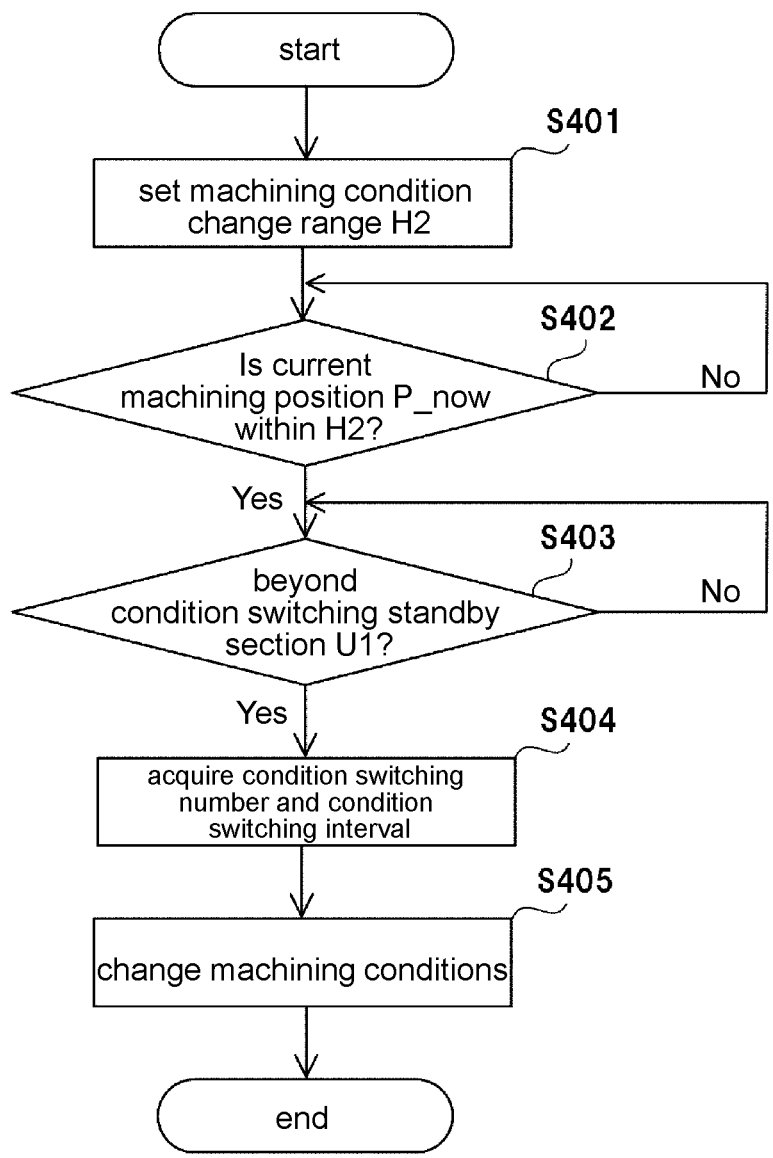
FIG. 12 is a flowchart showing steps of changing machining conditions during the second cut machining of the disclosure.
Figure 13:
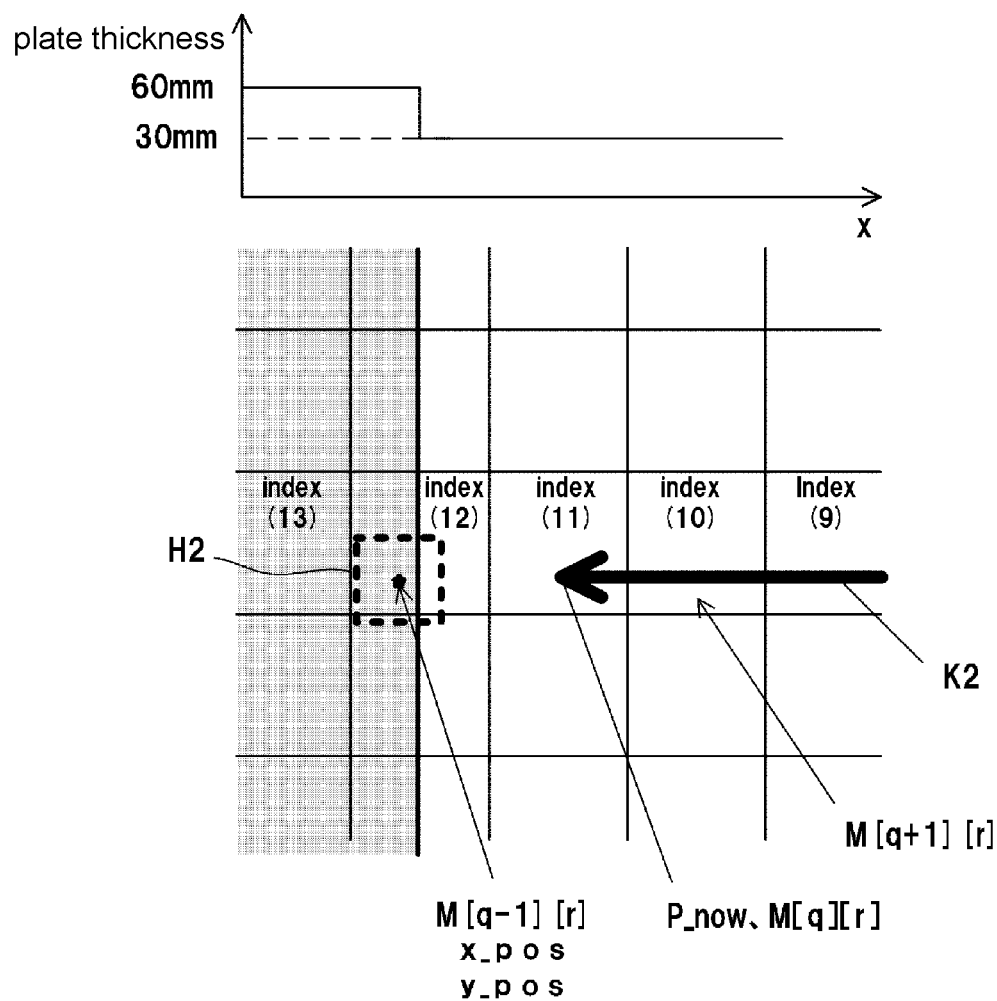
FIG. 13 is a schematic diagram showing a method of changing the machining conditions during the second cut machining of the disclosure.
Figure 14:
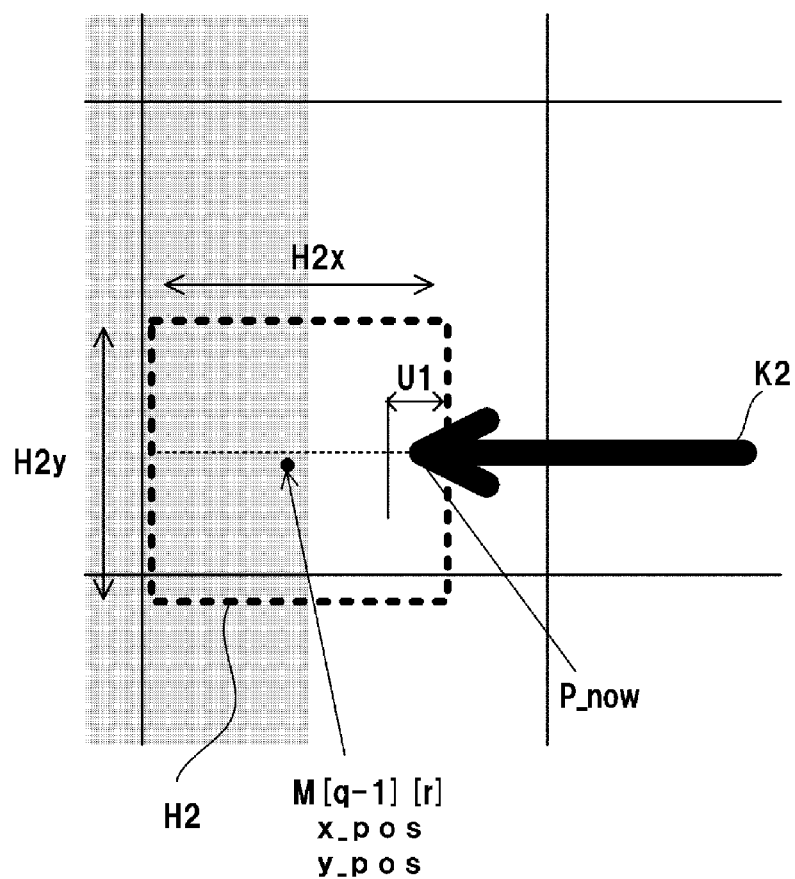
FIG. 14 is a schematic diagram showing details of the method of changing the machining conditions during the second cut machining of the disclosure.

FIG. 12 is a flowchart showing steps of changing the machining conditions during the second cut machining of the disclosure, and FIG. 13 is a schematic diagram showing a method of changing the machining conditions during the second cut machining of the disclosure. FIG. 14 is a schematic diagram showing details of the method of changing the machining conditions during the second cut machining of the disclosure.

Here, the machining condition change step (S103) of actually changing the machining conditions is described using the divided region data D of the reference divided region MT.

First, a machining condition change range H2 is set (S401). Specifically, in the divided region data D of the reference divided region MT, the x-coordinate value x_pos and the y-coordinate value y_pos of the position where the plate thickness is detected in the first cut step are read out, and the position where the plate thickness is detected is used as the center to set the machining condition change range H2. Here, a rectangular range, in which an x_pos±x direction machining condition change range H2x is used as an x-axis direction range and a y_pos±y direction machining condition change range H2y is used as a y-axis direction range, is used as the machining condition change range H2 (FIG. 14).

Then, whether the current machining position P_now is within the machining condition change range H2 is determined (S402). If the machining position P_now is outside the machining condition change range H2, monitoring is performed until the machining position P_now enters the machining condition change range H2.

When the machining position P_now enters the machining condition change range H2, the machining conditions are not changed unless the machining position P_now advances inward from a boundary of the machining condition change range H2 beyond a condition switching standby section U1 (S402). When the machining position P_now travels inward from the boundary of the machining condition change range H2 beyond the condition switching standby section U1 (S403), a condition switching number N2 and a condition switching interval U2 that are stored in advance are read out (S404), and the machining proceeds while the machining conditions are changed step by step with the condition switching number N2 and condition switching interval U2 (S405). Thereafter, when the NC controller 5 receives a command to end the second cut machining, the machining is ended.

Figure 16:
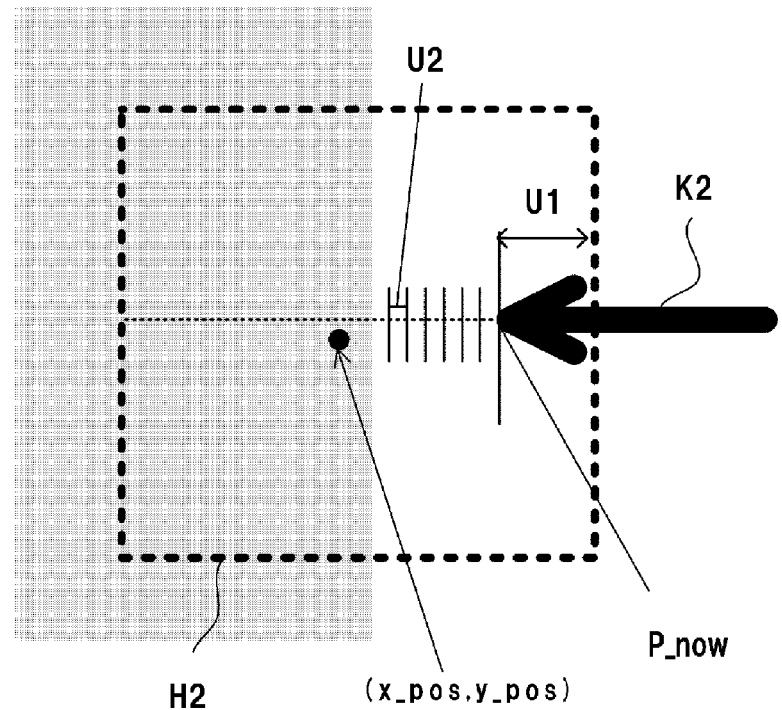
FIG. 16 is a schematic diagram 2 showing details of the method of changing the machining conditions during the second cut machining of the disclosure.

FIG. 16 is a schematic diagram 2 showing details of the method of changing the machining conditions during the second cut machining of the disclosure.

The diagram shows a specific method of changing the machining conditions step by step with the condition switching number N2 and the condition switching interval U2. First, the NC controller 5 refers to the reference plate thickness information selected in S307 or S308, reads out the machining conditions suitable for the plate thickness of the reference plate thickness information from the database, and changes the machining conditions step by step for each switching interval U2 as final target values to set conditions in the wire electric discharge machining apparatus 100. When the conditions are set while the machining conditions are gradually changed step by step, the machining conditions read from the database are finally set in the wire electric discharge machining apparatus 100.

As described above, the wire electric discharge machining method of the disclosure estimates the level difference position in the end surface finishing step based on the plate thickness information for each divided region detected and stored in the first cut, and specifies the level difference position. Therefore, even if the machining path K1 for the first cut and the machining path K2 for the second cut or later are different, the level difference position can be reliably specified in the second cut or later, and the machining conditions can be automatically changed and set. In addition, the wire electric discharge machining method of the embodiment has an advantage that the level difference position can be detected even when the machining traveling direction of the second cut is different from the machining traveling direction of the first cut. The wire electric discharge machining method of the disclosure does not have to be carried out in the same manner as the embodiment, and can be appropriately modified and carried out as the several examples that have already been given.

INDUSTRIAL APPLICABILITY

The disclosure can be effectively used for precise machining of a mold or a metal part having a level difference. The wire electric discharge machining method of the disclosure provides a machining method that is excellent in machining shape precision of this type of mold or metal part and improves workability.

What is claimed is:

1. A wire electric discharge machining method, comprising: a division step in which an XY-plane of a workpiece stand of a wire electric discharge machining apparatus is divided into small regions to form a plurality of divided regions; a storage step in which a plate thickness of the workpiece is detected and stored in association with the divided regions as plate thickness information; an estimation step in which a peripheral region comprising a current machining position of the workpiece is set as a search range, and with reference to the plate thickness information associated with the divided regions within the search range, whether there is a level difference ahead of a traveling direction of a machining path is estimated according to the plate thickness information associated with the divided regions and a plate thickness of the workpiece at the current machining position; and a machining condition change step in which a peripheral region comprising a position of the level difference is set as a machining condition change range, and machining conditions are changed when the current machining position of the workpiece enters the machining condition change range.

2. The wire electric discharge machining method according to claim 1, wherein the storage step is executed in a rough machining step, and the estimation step and the machining condition change step are executed in an end surface finishing step.

3. The wire electric discharge machining method according to claim 2, wherein in the storage step, first plate thickness information which is a plate thickness at the time of the detection and second plate thickness information which is a previous plate thickness are stored in association with the divided regions;

in the estimation step, when a machining path of the end surface finishing step is in the same direction as a machining path of the rough machining step, whether there is a level difference ahead of the traveling direction of the machining path is estimated according to the first plate thickness information and the plate thickness of the workpiece at the current machining position, and when the machining path of the end surface finishing step is in the opposite direction to the machining path of the rough machining step, whether there is a level difference ahead of the traveling direction of the machining path is estimated according to the second plate thickness information and the plate thickness of the workpiece at the current machining position.

4. The wire electric discharge machining method according to claim 1, wherein in the storage step, a position in which the plate thickness of the workpiece is detected is stored in association with the divided regions; and in the machining condition change step, a range centered on the position in which the plate thickness of the workpiece is detected is set as the machining condition change range.

5. The wire electric discharge machining method according to claim 1, wherein in the machining condition change step, when the machining conditions are changed, the machining conditions are changed step by step with respect to a target value for changing the machining conditions.

6. A wire electric discharge machining apparatus comprising a NC controller, wherein the NC controller comprises:

a detection unit which detects a plate thickness of a workpiece in a rough machining step;

a storage unit which stores the plate thickness as plate thickness information in association with divided regions obtained by dividing an XY-plane of a workpiece stand of the wire electric discharge machining apparatus into small regions; and a processing unit, wherein in an end surface finishing step, the processing unit sets a peripheral region comprising a current machining position of the workpiece as a search range, and with reference to the plate thickness information associated with the divided regions within the search range, estimates whether there is a level difference ahead of a traveling direction of a machining path according to the plate thickness information associated with the divided regions and a plate thickness of the workpiece at the current machining position; and the processing unit sets a peripheral region comprising a position of the level difference as a machining condition change range, and performs a control of changing the machining conditions when the current machining position of the workpiece enters the machining condition change range.

* * * * *